Figure 1:
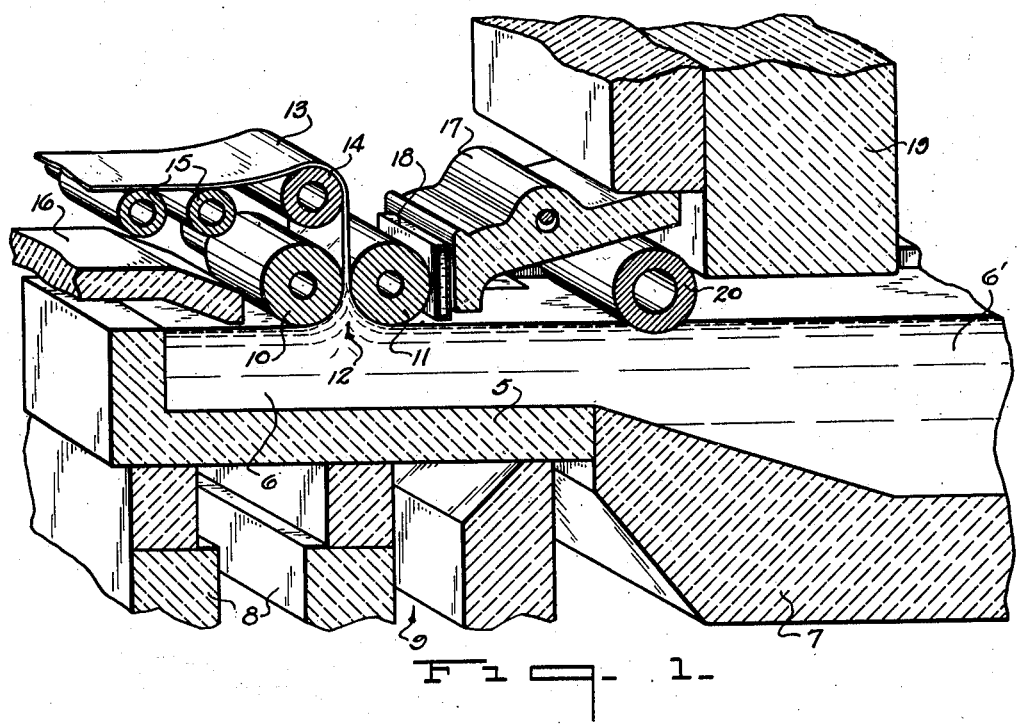

Sept. 28, 1937.  F. R. HOHMANN  2,094,403

SHEET GLASS APPARATUS

Filed Dec. 13, 1933

Inventor
FREDERICK R. HOHMANN.
By Frank Fraser
Attorney

Patented Sept. 28, 1937

2,094,403

UNITED STATES PATENT OFFICE 2,094,403

SHEET GLASS APPARATUS

Frederick R. Hohmann, Charleston, W. Va., assignor to Libbey-Owens-Ford Glass Company, Toledo, Ohio, a corporation of Ohio Application December 13, 1933, Serial No. 702,184

10 Claims. (Cl. 49—33)

The present invention relates broadly to the manufacture of sheet glass and more particularly to an improved method and apparatus for the production of a continuous sheet or ribbon of glass by a rolling operation.

In the production of sheet glass according to one well-known process, a pair of relatively large internally cooled rotatable sheet forming rolls are mounted side by side above and in close proximity to the surface of a bath of molten glass contained within a relatively shallow working receptacle or draw-pot, the said receptacle being continuously supplied with molten glass from a tank furnace communicating therewith. The two forming rolls are horizontally spaced from one another to create a vertical sheet forming pass therebetween and, upon rotation, are adapted to draw a relatively heavy body of glass upwardly from the molten bath and reduce it to a sheet of substantially predetermined and uniform thickness. The sheet is continued upwardly for a short distance and then deflected over a bending roll into the horizontal plane, said sheet being carried forwardly upon a series of conveying rolls which deliver it into a flattening chamber from which it passes into and through an annealing leer. It is preferred, in the above process, that the sheet forming rolls be so arranged that the lower portions of the peripheries thereof just contact with the upper surface of the bath of molten glass within the working receptacle, being neither above nor beneath the same but tangent therewith.

When producing sheet glass in the manner above described it is essential that the molten glass at the point of removal from the working receptacle be maintained at a relatively high temperature and, in fact, at a considerably higher temperture than is necessary in some other processes of forming sheet glass, such as, for example, in the well-known Colburn sheet drawing process. This relatively high temperature is required in order, among other things, to offset the relatively great chilling effect produced by the internally cooled sheet forming rolls, whereby the glass can be maintained at a temperature sufficient to permit of the drawing up of a relatively heavy body of molten glass and the rolling thereof to sheet form. Furthermore, a rolling machine of the above character naturally withdraws a much larger tonnage of glass from the furnace in a day than does, for instance, the Colburn machine.

When controlling the operation of the tank furnace, having in mind the supplying of the necessary amount of glass at the proper temperature to the working receptacle, I have observed that there is a tendency for surface seeds and blisters to form upon the top of the molten glass as it flows through the melting and refining portions of the furnace. As is well known, seeds and blisters are simply air and gas bubbles which form in the glass, and which, if permitted to pass into the sheet, will result in defects therein.

The aim and object, therefore, of the present invention resides in the provision of a novel and improved method of and apparatus for effecting the removal of these surface seeds and blisters from the glass prior to the passage of the glass into the working receptacle to the end that the molten glass within said receptacle will be of an improved quality, resulting in a sheet relatively free from seeds and blisters.

Briefly stated, this is accomplished by the immersion of a cylindrical member or roll within the molten glass in advance of the working receptacle, said cylindrical member or roll extending transversely of the furnace and being positively driven. The cylindrical member or roll is also preferably metallic and internally cooled by the circulation of a suitable cooling medium therethrough. I have discovered that a cooled cylindrical member or roll slightly immersed within the molten glass and driven at a peripheral speed relatively greater than the movement of the glass therebeneath acts to effect the breaking up and dispersion of the surface seeds and blisters present upon the top of the molten glass. This is caused not only by the direct contact of the cooled member or roll with the seeds and blisters (air and gas bubbles) but also due to the fact that the rotation of the said member or roll results in the disturbance of the surface tension of the glass, causing a stretching of the seeds and blisters and the breaking thereof.

Other objects and advantages of the invention will become more apparent during the course of the following description when taken in connection with the accompanying drawing.

Figures 2, 3:
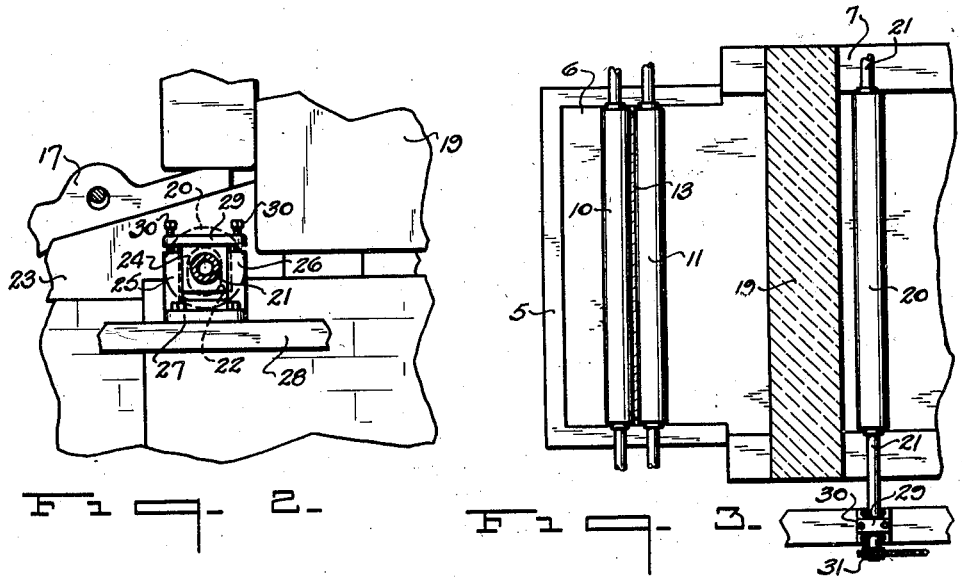

In the drawing, wherein like numerals are employed to designate like parts throughout the same, Fig. 1 is a vertical longitudinal section through sheet glass apparatus constructed in accordance with the present invention, Fig. 2 is a side elevation of a portion thereof, and Fig. 3 is a horizontal sectional view showing an alternative arrangement.

Referring now to the drawing, 5 designates a relatively shallow working receptacle or draw-pot adapted to contain a mass of molten glass 6 which may be continuously supplied thereto from a suitable tank furnace 7. The working receptacle 5 is preferably supported upon stools 8 above a heating chamber 9 heated in any conventional manner.

Arranged above the mass of molten glass 6 within working receptacle 5 is a pair of sheet forming rolls 10 and 11 respectively mounted with respect to one another to create a vertical sheet forming pass therebetween. The rolls are adapted to be positively driven and, upon rotation, are adapted to draw a relatively heavy body of glass 12 upwardly from the molten mass 6 and reduce it to a sheet 13 of substantially predetermined and uniform thickness. The sheet may be continued upwardly for a relatively short distance and then deflected over a rotatable bending roll 14 into the horizontal place and carried forwardly upon a series of conveying rolls 15 into and through an annealing leer (not shown).

In order to assist in properly conditioning the bath of molten glass 6 and to protect the forming rolls and sheet, there is positioned above the working receptacle 5 suitable cover or lip tiles 16 and 17, which direct heated gases issuing from the furnace 7 and pot chamber 9 downwardly upon the molten glass. Associated with the cover tile 17 is a cooler 18 also serving to prevent heat and gases from striking the forming rolls and also from striking and injuring the sheet being formed. Arranged at substantially the juncture of the furnace 7 and working receptacle 5 is a jack-arch 19 having its lower end terminating relatively close to but spaced from the surface of the body of molten glass 6' within the furnace.

As stated above, it is desirable that the forming rolls 10 and 11 be so arranged that the lower portions of the peripheries thereof are located substantially at the surface of the mass of molten glass 6, being preferably neither above nor beneath the same. Also, that in the operation of this type of machine, it is necessary that the molten glass within the receptacle be maintained at a relatively high temperature in order to permit of the proper formation of the sheet.

However, in firing and handling the tank furnace in the manner necessary to supply a sufficient quantity of molten glass at the required temperature to the working receptacle, I have observed that there is a tendency for seeds and blisters to form upon the surface of the body of the molten glass as it flows through the furnace to the working receptacle. Obviously, this is an undesirable condition, since the drawing of these seeds and blisters into the glass sheet will naturally result in defects therein.

The primary purpose of this invention, therefore, lies in the provision of means for breaking up these surface seeds and blisters before the glass flows into the working receptacle. To this end, there is provided a preferably metallic cylindrical member or roll 20 extending transversely the entire width of the furnace and being slightly immersed within the body of molten glass 6' in advance of the working receptacle. For instance, the roll 20 may be positioned relatively closely adjacent the jack-arch 19 at the side thereof adjacent the working receptacle, as illustrated in Fig. 1, or at the opposite side of the jack-arch as shown in Fig. 3. The roll 20 is hollow and preferably internally cooled by the circulation of a suitable cooling medium therethrough.

The roll 20 is provided at its opposite ends with the reduced end portions 21 which project through vertical slots 22 (Fig. 2) formed in the refractory blocks 23 arranged at opposite ends of the cover tile 17, said end portions being rotatably mounted in bearing blocks 24 which are slidably received between spaced vertical posts 25 and 26 carried by a base plate 27 secured to a horizontal supporting member 28. Fastened to the upper end of each bearing block 24 is a horizontal bar 29 through which are vertically threaded screws 30, the lower ends of which rest upon the tops of the posts 25 and 26. With this construction, it will be readily apparent that the roll 20 can be readily raised or lowered to vary the depth of immersion thereof within the molten glass by simply rotating the screws 30 in the proper direction. The roll 20 is also adapted to be positively driven, such as by means of a chain and sprocket drive or the like 31 (Fig. 3).

I have discovered, by actual practice, that the use of the internally cooled metallic roll 20 seems to effect the breaking up and dispersion of the surface seeds and blisters present upon the top of the molten glass as they are carried therebeneath. The breaking up of these surface seeds and blisters which, as pointed out above, are simply air and gas bubbles, is due not only to the direct contact of the cooled roll with the said seeds and blisters but also to the disturbance of the surface tension of the glass. In other words, since the roll is being rotated at a peripheral speed relatively faster than the speed of movement of the glass therebeneath, the said roll tends to stretch the upper layer of glass, therefore increasing the surface tension thereof, and causing the breaking of the air and gas bubbles.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a working receptacle containing a mass of molten glass, a furnace in communication with said receptacle for supplying the molten glass thereto, a pair of rotatable forming rolls arranged side by side above the working receptacle and adapted, upon rotation, to draw a body of molten glass upwardly from said mass and reduce it to sheet form, said forming rolls being so arranged that the lower portions of the peripheries thereof are disposed substantially at the surface of the mass of molten glass, a movable metallic member extending transversely of the furnace in advance of said forming rolls and being immersed to a uniform depth throughout the width of the mass of molten glass therein for effecting the breaking up of surface seeds and blisters present upon the glass, and means for cooling said movable metallic member to prevent the molten glass from sticking thereto.

2. In sheet glass apparatus, a working receptacle containing a mass of molten glass, a furnace in communication with said receptacle for supplying the molten glass thereto, a pair of rotatable forming rolls arranged side by side above the working receptacle and adapted, upon rotation, to draw a body of molten glass upwardly from said mass and reduce it to sheet form, said forming rolls being so arranged that the lower portions of the peripheries thereof are disposed substantially at the surface of the mass of molten glass, a rotatable metallic member extending transversely of the furnace in advance of said forming rolls and being immersed to a uniform depth throughout the width of the mass of molten glass therein for effecting the breaking up of surface seeds and blisters present upon the glass, and means for cooling said rotatable metallic member to prevent the molten glass from sticking thereto.

3. In sheet glass apparatus, a working receptacle containing a mass of molten glass, a furnace in communication with said receptacle for supplying the molten glass thereto, a pair of rotatable forming rolls arranged side by side above the working receptacle and adapted, upon rotation, to draw a body of molten glass upwardly from said mass and reduce it to sheet form, said forming rolls being so arranged that the lower portions of the peripheries thereof are disposed substantially at the surface of the mass of molten glass, a rotatable cylindrical metallic member extending transversely of the furnace in advance of said forming rolls and being immersed to a uniform depth throughout the width of the mass of molten glass therein for effecting the breaking up of surface seeds and blisters present upon the glass, and means for internally cooling said rotatable cylindrical metallic member to prevent the molten glass from sticking thereto.

4. In sheet glass apparatus, a working receptacle containing a mass of molten glass, a furnace in communication with said receptacle for supplying the molten glass thereto, a pair of rotatable forming rolls arranged side by side above the working receptacle and adapted, upon rotation, to draw a relatively heavy body of molten glass upwardly from said mass and reduce it to sheet form, said forming rolls being so arranged that the lower portions of the peripheries thereof are disposed substantially at the surface of the mass of molten glass, a rotatable metallic roll extending transversely of the furnace in advance of said forming rolls, said rotatable roll being of a uniform diameter across the width of the furnace and being immersed within the molten glass therein for effecting the breaking up of surface seeds and blisters present upon the glass, and means for cooling said roll to prevent the molten glass from sticking thereto.

5. In sheet glass apparatus, a working receptacle containing a mass of molten glass, a furnace in communication with said receptacle for supplying the molten glass thereto, a pair of rotatable forming rolls arranged side by side above the working receptacle and adapted, upon rotation, to draw a relatively heavy body of molten glass upwardly from said mass and reduce it to sheet form, said forming rolls being so arranged that the lower portion of the peripheries thereof are disposed substantially at the surface of the mass of molten glass, a rotatable cylindrical metallic member extending transversely of the furnace in advance of said forming rolls and being immersed to a uniform depth throughout the width of the mass of molten glass therein for effecting the breaking up of surface seeds and blisters present upon the glass, and means for cooling said cylindrical member to prevent the molten glass from sticking thereto.

6. In sheet glass apparatus, a working receptacle containing a mass of molten glass, a furnace blisters present upon the glass, and means for plying the molten glass thereto, a pair of rotatable forming rolls arranged side by side above the working receptacle and adapted, upon rotation, to draw a relatively heavy body of molten glass upwardly from said mass and reduce it to sheet form, said forming rolls being so arranged that the lower portions of the peripheries thereof are disposed substantially at the surface of the mass of molten glass, a rotatable metallic roll extending transversely of the furnace in advance of said forming rolls, said rotatable roll being of a uniform diameter across the width of the furnace and being immersed within the molten glass therein for effecting the breaking up of surface seeds and blisters present upon the glass, and means for internally cooling said roll to prevent the molten glass from sticking thereto.

7. In sheet glass apparatus, a working receptacle containing a mass of molten glass, a furnace in communication with said receptacle for supplying the molten glass thereto, a pair of rotatable forming rolls arranged side by side above the working receptacle and adapted, upon rotation, to draw a relatively heavy body of molten glass upwardly from said mass and reduce it to sheet form, said forming rolls being so arranged that the lower portions of the peripheries thereof are disposed substantially at the surface of the mass of molten glass, a rotatable cylindrical metallic member extending transversely of the furnace in advance of said forming rolls and being immersed to a uniform depth throughout the width of the mass of molten glass therein for effecting the breaking up of surface seeds and blisters present upon the glass, means for cooling said cylindrical member to prevent the molten glass from sticking thereto, and means for mounting the cylindrical member so that it can be adjusted vertically to vary the depth of immersion thereof within the molten glass.

8. In sheet glass apparatus, a working receptacle containing a mass of molten glass, a furnace in communication with said receptacle for supplying the molten glass thereto, a pair of rotatable forming rolls arranged side by side above the working receptacle and adapted, upon rotation, to draw a relatively heavy body of molten glass upwardly from said mass and reduce it to sheet form, said forming rolls being so arranged that the lower portions of the peripheries thereof are disposed substantially at the surface of the mass of molten glass, a rotatable metallic roll extending transversely of the furnace in advance of said forming rolls, said rotatable roll being of a uniform diameter across the width of the furnace and being immersed within the molten glass therein for effecting the breaking up of surface seeds and blisters present upon the glass, means for internally cooling said roll to prevent the molten glass from sticking thereto, and means for mounting the roll so that it can be adjusted vertically to vary the depth of immersion thereof within the molten glass.

9. In the method of forming continuous sheet glass, wherein molten glass is continuously flowed from a tank furnace into a relatively shallow working receptacle, the process consisting in drawing a relatively heavy body of glass upwardly from substantially the surface of the molten mass of glass in said receptacle and rolling it to sheet form, in breaking up the surface seeds and blisters present upon the mass of glass by immersing an artificially cooled heat absorbing body within said mass and to a uniform depth across the width thereof at a point in advance of the point of sheet formation, and in revolving said heat absorbing body to cause a disturbance of the surface tension of the glass passing therebeneath while preventing the molten glass from sticking thereto.

10. In the method of forming continuous sheet glass, wherein molten glass is continuously flowed from a tank furnace into a relatively shallow working receptacle, the process consisting in moving a relatively heavy body of glass upwardly from substantially the surface of the molten mass through a sheet forming pass defined between a pair of rotatable rolls and reduced thereby to sheet form, in breaking up the surface seeds and blisters present upon the glass before the glass reaches the point of sheet formation by immersing an artificially cooled heat absorbing body within said mass and to a uniform depth across the width thereof, and in continuously revolving said heat absorbing body to cause a disturbance of the surface tension of the glass passing therebeneath while preventing the molten glass from sticking thereto.

FREDERICK R. HOHMANN.